(12) United States Patent
Sun et al.

(10) Patent No.: US 10,873,967 B2
(45) Date of Patent: Dec. 22, 2020

(54) MULTI-CARRIER PREEMPTION INDICATOR

(71) Applicant: QUALCOMM Incorporated, San Diego, CA (US)

(72) Inventors: Jing Sun, San Diego, CA (US); Jeonghun Park, San Diego, CA (US); Jing Jiang, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/262,605

(22) Filed: Jan. 30, 2019

(65) Prior Publication Data

US 2019/0246419 A1 Aug. 8, 2019

Related U.S. Application Data

(60) Provisional application No. 62/625,844, filed on Feb. 2, 2018.

(51) Int. Cl.
*H04L 1/18* (2006.01)
*H04L 5/00* (2006.01)
(Continued)

(52) U.S. Cl.
CPC ....... *H04W 72/1289* (2013.01); *H04L 1/1812* (2013.01); *H04L 5/0007* (2013.01);
(Continued)

(58) Field of Classification Search
CPC .......... H04B 17/30–382; H04J 11/0023–0093; H04J 2011/0003–0096;
(Continued)

(56) References Cited

U.S. PATENT DOCUMENTS

2009/0147735 A1\* 6/2009 Ghosh ..................... H04W 8/30
2019/0261372 A1\* 8/2019 Zhou ................. H04W 72/0453

FOREIGN PATENT DOCUMENTS

WO WO-2018082423 A1 \* 5/2018 ........ H04W 72/0453
WO WO-2019145834 A1 \* 8/2019 ........ H04W 72/1289

OTHER PUBLICATIONS

Intel Corporation: "Remaining details on multiplexing data with different durations", 3GPP Draft: R1-1800336 Intel—Preemption, 3rd Generation Partnership Project (3GPP), Mobile Competence Centre; 650, Route Des Lucioles; F-06921 Sophia-Antipolis Cedex; France; Jan. 22, 2018-Jan. 26, 2018. (Year: 2018).\*

(Continued)

*Primary Examiner* — Timothy J Weidner
(74) *Attorney, Agent, or Firm* — Steven A. Raney

(57) ABSTRACT

Methods, systems, devices, and apparatuses for wireless communication are disclosed. In one aspect, a base station multiplexes services on shared channel resources with preemption. The base station may send one or more control messages with multi-carrier preemption information to user equipment (UE) devices which may be affected by the preemption. The preemption information may relate to a primary component carrier and one or more secondary component carriers designated for the UEs. In some aspects, the control message may comprise an indication of the availability of preemption information for each carrier in a plurality of carriers and may also include variable-size preemption information which is identifiable to the plurality carriers based on the subset of carriers for which preemption information is indicated as available. UEs may adjust the manner in which they send or receive a data transmission based on the preemption information. Additional aspects, embodiments, and features are described and claimed.

43 Claims, 8 Drawing Sheets

(51) Int. Cl.
| | |
|---|---|
| *H04W 4/06* | (2009.01) |
| *H04W 4/08* | (2009.01) |
| *H04W 4/70* | (2018.01) |
| *H04W 8/24* | (2009.01) |
| *H04W 28/02* | (2009.01) |
| *H04W 28/04* | (2009.01) |
| *H04W 72/00* | (2009.01) |
| *H04W 72/12* | (2009.01) |
| *H04W 88/02* | (2009.01) |
| *H04W 88/08* | (2009.01) |
| *H04W 92/10* | (2009.01) |

(52) U.S. Cl.
CPC .......... *H04L 5/0044* (2013.01); *H04L 5/0096* (2013.01); *H04W 4/06* (2013.01); *H04W 4/08* (2013.01); *H04W 4/70* (2018.02); *H04W 8/245* (2013.01); *H04W 28/0215* (2013.01); *H04W 28/04* (2013.01); *H04W 72/005* (2013.01); *H04W 72/1294* (2013.01); *H04W 88/02* (2013.01); *H04W 88/08* (2013.01); *H04W 92/10* (2013.01)

(58) Field of Classification Search
CPC ........... H04L 1/0001–22; H04L 5/0001–0098; H04W 4/06; H04W 4/08; H04W 4/70; H04W 8/22–245; H04W 16/14–16; H04W 24/02; H04W 24/10; H04W 28/02–26; H04W 48/02–20; H04W 72/005–14; H04W 72/002–06; H04W 88/02; H04W 88/06–10; H04W 92/04; H04W 92/10
See application file for complete search history.

(56) References Cited

OTHER PUBLICATIONS

Vivo: "Multiplexing data with different transmission durations", 3GPP Draft; R1-1800205 Multiplexing Data With Different Transmission Durations, 3rd Generation Partnership Project (3GPP), Mobile Competence Centre; 650, Route Des Lucioles; F-06921 Sophia-Antipolis; Jan. 22, 2018-Jan. 26, 2018. (Year: 2018).*

Huawei., et al., "Summary of Remaining Issues on Pre-Emption Indication with TP", 3GPP Draft; R1-1800050, 3rd Generation Partnership Project (3GPP), Mobile Competence Centre, 650, Route Des Lucioles ; F-06921 Sophia-Antipolis Cedex, France, vol. RAN WG1, No. Vancouver, Canada; Jan. 22, 2018-Jan. 26, 2018, Jan. 13, 2018 (Jan. 13, 2018), 5 Pages, XP051384553, Retrieved from the Internet: URL: http://www.3gpp.org/ftp/tsg_ran/WG1_RL1/TSGR1_AH/NR_AH_1801/Docs/ [retrieved on Jan. 13, 2018], p. 1-p. 4.

Intel Corporation: "Remaining Details on Multiplexing Data with Different Durations", 3GPP Draft; R1-1800336 Intel—Preemption, 3rd Generation Partnership Project (3GPP), Mobile Competence Centre, 650, Route Des Lucioles ; F-06921 Sophia-Antipolis Cedex, France, vol. RAN WG1, No. Vancouver, Canada; Jan. 22, 2018-Jan. 26, 2018, Jan. 13, 2018 (Jan. 13, 2018), pp. 1-5, XP051384795, Retrieved from the Internet: URL: http://www.3gpp.org/ftp/tsg_ran/WG1-RL1/TSGR1_AH/NR_AH_1801/Docs/ [retrieved on Jan. 13, 2018] [retrieved on Jan. 13, 2018], p. 2.

International Search Report and Written Opinion—PCT/US2019/016116—ISA/EPO—dated Apr. 30, 2019.

Vivo: "Multiplexing Data with Different Transmission Durations", 3GPP Draft, R1-1800205, 3GPP TSG RAN WG1 Meeting AH 1801, 3rd Generation Partnership Project (3GPP), Mobile Competence Centre ; 650, Route Des Lucioles ; F-06921 Sophia-Antipolis, vol. RAN WG1, No. Vancouver, Canada, Jan. 22-26, 2018, Jan. 13, 2018 (Jan. 13, 2018), 6 Pages, XP051384694, Retrieved from the Internet: URL: http://www.3gpp.org/ftp/tsg ran/WG1_RL1/TSGR1_AH/NR_AH_1801/Docs/ and URL:http://www.3gpp.org/ftp/tsg_ran/WG1_RL1/TSGR1_AH/NR AH 1801/Docs/ [retrieved on Jan. 13, 2018] Section 3.1, p. 1-p. 2.

* cited by examiner

MULTI-CARRIER PREEMPTION INDICATOR

CLAIM OF PRIORITY UNDER 35 U.S.C. § 119

The present application for patent claims priority to Provisional Application No. 62/625,844 entitled "MULTI-CARRIER PREEMPTION INDICATOR" filed Feb. 2, 2018, and assigned to the assignee hereof and hereby expressly incorporated by reference herein.

BACKGROUND

Technical Field

The following relates generally to wireless communication, and more specifically to systems, methods, and devices that support preemption-based multiplexing.

Introduction

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may also be referred to as New Radio (NR) systems. These systems may employ multiple-access technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each supporting communication for multiple communication devices, which may be otherwise known as user equipment (UE).

The various multiple-access communication systems above have been specified in telecommunication standards in order to provide a common protocol that enables different wireless devices to communicate. An example of an evolving telecommunication standard is 5G New Radio. 5G New Radio is being promulgated by the Third Generation Partnership Project (3GPP) to meet new requirements associated with latency, reliability, security, and scalability (e.g., with Internet of Things (IoT)). In an environment where different types of services are provided and different requirements must be met simultaneously, there is a need for continued innovation. The techniques described herein are broadly applicable to multi-access technologies in which preemption-based scheduling of different traffic types is supported and to their corresponding telecommunication standards.

SUMMARY

The described techniques relate generally to improved methods, systems, and devices that support preemption-based multiplexing in a multi-carrier environment. In one particular aspect, the described techniques may be applied to the preemption of enhanced mobile broadband (eMBB) transmissions by ultra-reliable low latency communication (URLLC) transmissions and to control signaling associated with such preemption.

A method of wireless communication performed by a user equipment (UE) is described. The method may include receiving, in a downlink control channel, a control message comprising an indication of the availability of preemption information for a plurality of carriers, and determining whether the plurality of carriers comprises at least one carrier on which the UE is scheduled to send or receive a data transmission. The method may include identifying preemption information for the at least one carrier in a variable-size preemption information based on a subset of the plurality of carriers for which preemption information is indicated as available, and communicating with a base station on the at least one carrier based on resources for the scheduled data transmission and on the preemption information.

An user equipment is described. The UE may include means for receiving, in a downlink control channel, a control message comprising an indication of the availability of preemption information for a plurality of carriers and means for determining whether the plurality of carriers comprises at least one carrier on which the UE is scheduled to send or receive a data transmission. The apparatus may also include means for identifying preemption information for the at least one carrier in a variable-size preemption information based on a subset of the plurality of carriers for which preemption information is indicated as available and means for communicating with a base station on the at least one carrier based on resources for the scheduled data transmission and on the preemption information.

Another apparatus for wireless communication is described. The apparatus may include a processor, memory in electronic communication with the processor, and instructions stored in the memory. The instructions may be operable, when executed by the processor, to cause the apparatus to receive, in a downlink control channel, a control message comprising an indication of the availability of preemption information for a plurality of carriers and determine whether the plurality of carriers comprises at least one carrier on which the apparatus is scheduled to send or receive a data transmission. The instructions may further be operable, when executed by the processor, to cause the apparatus to identify preemption information for the at least one carrier in a variable-size preemption information based on a subset of the plurality of carriers for which preemption information is indicated as available, and communicate with a base station on the at least one carrier based on resources for the scheduled data transmission and on the preemption information.

A non-transitory computer readable medium storing code for wireless communication is described. The code may include instructions executable by a processor to receive, in a downlink control channel, a control message comprising an indication of the availability of preemption information for a plurality of carriers and determine whether the plurality of carriers comprises at least one carrier on which the apparatus is scheduled to send or receive a data transmission. The code may also include instructions, executable by the processor, to identify preemption information for the at least one carrier in a variable-size preemption information based on a subset of the plurality of carriers for which preemption information is indicated as available, and communicate with a base station on the at least one carrier based on resources for the scheduled data transmission and on the preemption information Some examples of the method, apparatus, and non-transitory computer-readable medium described above may include operations, features, means, or instructions in which a location of the preemption information for the at least one carrier varies based on the subset of the plurality of carriers for which preemption information is indicated as available. Additionally, the operations, features, means, or instructions described herein may include the UE determining a mapping between bits of the control message comprising the indication of the availability of preemption information and corresponding carrier indices in a carrier aggregation configuration of the UE such that determining whether the plurality of carriers comprises at least one carrier on which the UE is scheduled to send or receive a data transmission is based at least in part on the mapping. In some aspects, the indication of the availability of preemption information comprises a first field of the control message having a fixed size, and wherein the variable-size preemption information comprises a second field of the control message having a variable size. In other aspects, the UE is operative to identify a subset of resources on which the UE is scheduled to send or receive the data transmission that are unavailable based on the preemption information.

A method of wireless communication performed by a base station is described. The method may include identifying one or more carriers in a plurality of carriers for which preemption information is available and generating an indication of the availability of preemption information for each carrier in the plurality of carriers according to a corresponding index value. The method may also include generating a control message comprising the indication of the availability of preemption information and variable-size preemption information in which preemption information for a carrier in the plurality of carriers is identifiable within the variable-size preemption information based on the indication. The method may also include transmitting the control message to a group of user equipment devices on a downlink control channel.

An apparatus for wireless communication is described. The apparatus may include means for generating an indication of the availability of preemption information for each carrier in the plurality of carriers according to a corresponding index value, and means for generating a control message comprising the indication of the availability of preemption information and variable-size preemption information, wherein preemption information for a carrier in the plurality of carriers is identifiable within the variable-size preemption information based on the indication. The apparatus may include means for transmitting the control message to a group of user equipment devices on a downlink control channel.

Another apparatus for wireless communication is described. The apparatus may include a processor, memory in electronic communication with the processor, and instructions stored in the memory. The instructions may be operable, when executed by the processor, to cause the apparatus to identify one or more carriers in a plurality of carriers for which preemption information is available and to generate an indication of the availability of preemption information for each carrier in the plurality of carriers according to a corresponding index value. The instructions may be further operable, when executed by the processor, to cause the apparatus to generate a control message comprising the indication of the availability of preemption information and variable-size preemption information, wherein preemption information for a carrier in the plurality of carriers is identifiable within the variable-size preemption information based on the indication and to transmit the control message to a group of user equipment devices on a downlink control channel.

A non-transitory computer readable medium storing code for wireless communication is described. The code may include instructions executable by a processor to identify one or more carriers in a plurality of carriers for which preemption information is available, and to generate an indication of the availability of preemption information for the carrier in the plurality of carriers according to a corresponding index value. The code may include instructions executable by the processor to generate a control message comprising the indication of the availability of preemption information and variable-size preemption information, wherein preemption information for a carrier in the plurality of carriers is identifiable within the variable-size preemption information based on the indication, and to transmit the control message to a group of user equipment devices on a downlink control channel.

DETAILED DESCRIPTION

Figure 1:
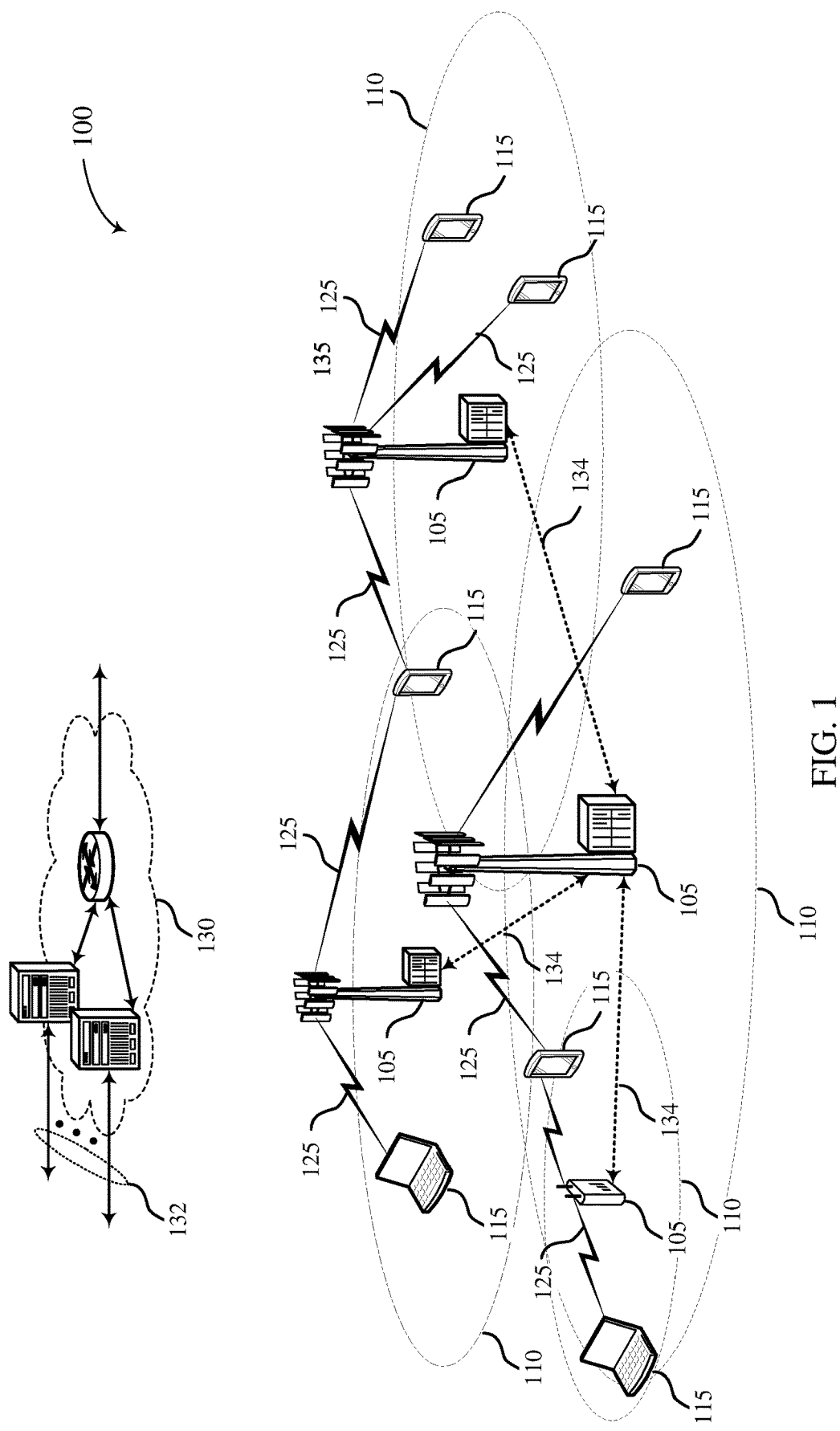
FIG. 1 shows an exemplary system for wireless communication that supports preemption-based multiplexing in accordance with aspects of the present disclosure.

As described herein, ultra-reliable low-latency traffic (URLLC) may be multiplexed with enhanced mobile broadband (eMBB) traffic in a wireless communication system. In some cases, the URLLC traffic may preempt or puncture resources occupied by, for example, an ongoing eMBB communication. This may occur when an eMBB device has been assigned or granted particular air link resources for communication and use of those resources is preempted by the URLLC traffic. This preemption may take the form of puncturing a portion of the shared channel resources scheduled for eMBB communication with the URLLC data. For example, the URLLC communication may take the place of a portion of the eMBB data in the ongoing eMBB communication.

Since the puncturing URLLC communication is not part of the eMBB communication, decoding errors will result if the eMBB device attempts to process it. Accordingly, some devices (e.g., a base station or a UE) may send preemption information for the URLLC transmission indicating that URLLC data is being sent on certain shared channel resources which may already be allocated for eMBB traffic. Other devices (e.g., a UE or a base station) may receive the preemption information indicating that URLLC data is being sent on particular shared channel resources and may puncture or preempt the eMBB communication.

As the use of additional component carriers for communication between a UE and a base station grows, the potential for preemption increases as does the amount of preemption information that must be conveyed in order to notify an eMBB device that may be affected by URLLC communications. The present disclosure provides innovative techniques for signaling preemption information for a plurality of carriers. The preemption information may be arranged in a control message such that the size of the preemption information can vary while the carrier to which it applies remains identifiable. In some aspects, the control message can be sent in different parts and may be addressed to a group of user equipment devices in common.

Aspects of the disclosure are initially described in the context of a wireless communications system. Additional aspects are illustrated by and described with reference to the following apparatus diagrams, system diagrams, and flowcharts that relate to providing preemption information in one or more control messages. While examples of the URLLC and eMBB services may be provided herein, it will be understood that the present disclosure is not limited to particular types of communication but can applied broadly to preemption-based multiplexing in wireless communication systems.

Those skilled in the art will understand that additional implementations and use cases may arise and that the innovations described herein may be implemented across different platforms, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or particular applications, a wide assortment of applicability of the described innovations is contemplated. Implementations may span the spectrum from chip-level or modular components to non-modular, non-chip-level implementations, and further to aggregate, distributed, or OEM devices or systems incorporating one or more aspects of the described innovations. In some practical settings, devices incorporating the described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, filters, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates an example of a wireless communications system 100 that supports preemption information in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. A base station 105 as described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions, from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a base station 105 may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or to enable automated behavior by machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be regarded as supporting different spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (Tf=307200*Ts). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols and, in some instances, a symbol of a mini-slot or the mini-slot itself may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one sub-carrier (e.g., a 15 kHz frequency range). A resource block may contain 12 consecutive subcarriers in the frequency domain and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations 105 or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs 115 that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
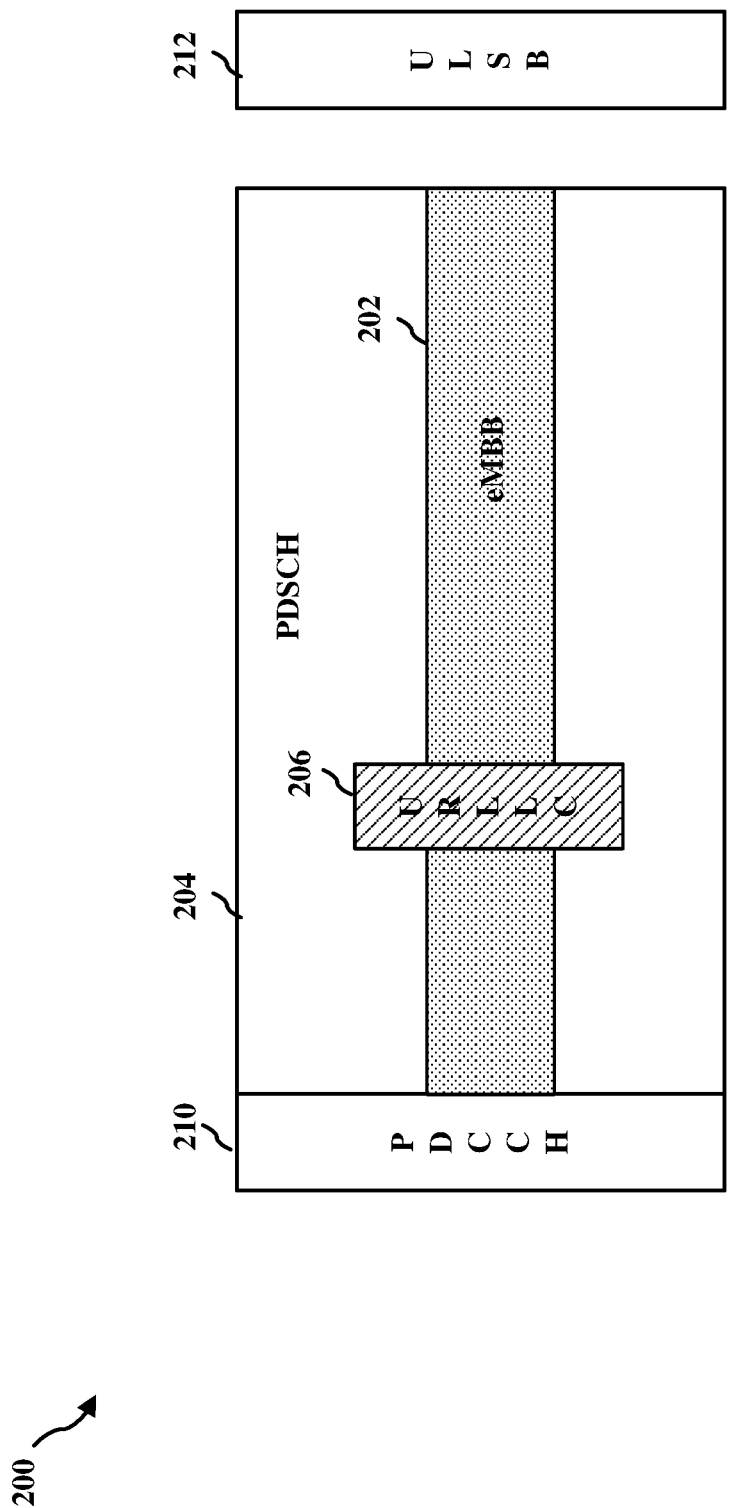
FIG. 2 shows an example of preemption-based multiplexing for URLLC and eMBB communications.

FIG. 2 shows an exemplary multiplexing of URLLC and eMBB communications. In the example, a slot 200 includes a physical downlink control channel (PDCCH) 210, a physical downlink shared channel (PDSCH) 204, and an uplink short burst (ULSB) 212 portion. The PDCCH 210 may be transmitted by a base station 105 and may carry control messages for the UEs 115 it serves. The control messages may unicast, or dedicated for use by a single UE, or they may be common to a group of UEs (group-common control messages). The ULSB 212 portion of slot 200 may be used by UEs 115 to transmit in the uplink direction and may be separated from the PDSCH 204 by a guard band.

As shown, the PDSCH 204 carries eMBB traffic 202. In this example, the eMBB traffic 202 spans the duration of the PDSCH 204 and may, for example, represent an ongoing eMBB communication between a base station 105 and one or more UEs 115, or it may represent a collection of slot-based allocations of PDSCH 204 resources. In some examples, PDSCH resources for eMBB traffic 202 comprise a number of resource block (RBs) which may be indexed within the PDSCH 204 and assigned for use by a UE 115. When the base station 105 identifies URLLC data for downlink transmission, it may puncture the eMBB traffic 202 with the URLLC data 206 or otherwise preempt the eMBB data, or reassign eMBB traffic resources for use by the URLLC traffic 206. As shown, URLLC traffic 206 may occupy only a small set of resources on the PDSCH 204, such as a mini-slot. From the perspective of the UE 115 receiving the eMBB traffic 202, a portion of its assigned resources do not represent eMBB data and thus will produce decoding errors if not accounted for in the decoding process. Similarly considerations apply in the uplink direction in which a UE 115 may modify its transmission on a physical uplink shared channel (PUSCH) based on identifying resources that are reassigned for use by URLLC traffic.

As will be recognized, slot 200 may represent one slot on each of a plurality of component carriers in a carrier aggregation configuration of a UE 115. In a carrier aggregation scenario, preemption-based multiplexing may affect different component carriers at different times. This, in turn, may complicate the decoding process for UE 115 and increase the amount of information which may be needed to properly decode transmissions on its primary component carrier and each of its secondary component carriers. The present disclosure provides control signaling which may be used to convey preemption information for multiple carriers in an efficient manner. In some aspects, as described herein, efficiency is improved through the use of cross-carrier signaling and a control format that accommodate variable-size preemption information while ensuring that preemption information remains identifiable to the affected carrier.

Figure 3:
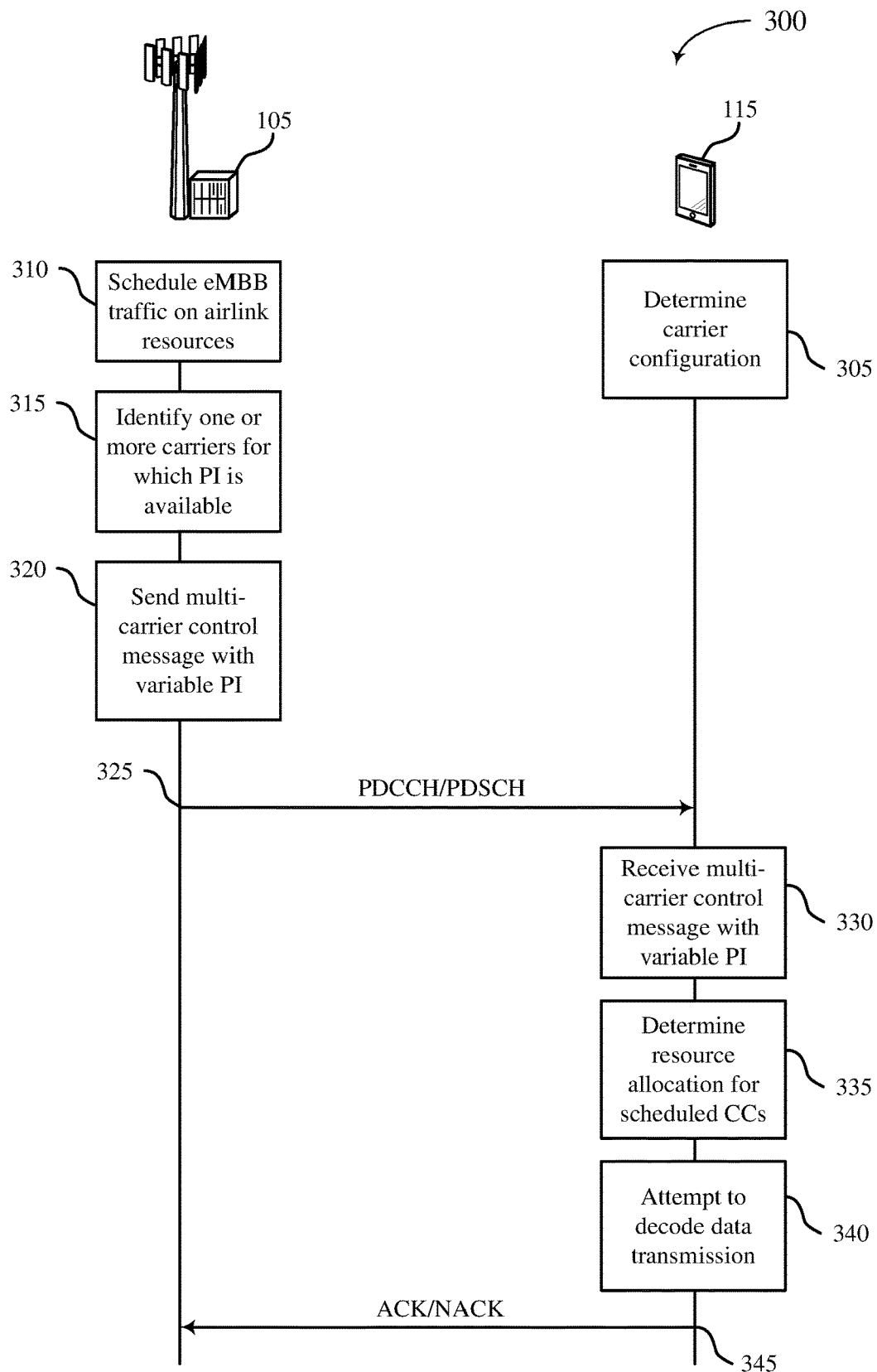
FIG. 3 shows an exemplary call flow in which multi-carrier preemption information is utilized in accordance with aspects of the present disclosure.

FIG. 3 shows an exemplary call flow 300 in which multi-carrier preemption information is utilized in accordance with aspects of the present disclosure. This example illustrates a downlink operation in which a UE 115 may adjust its decoding behavior in relation to a downlink data transmission based on preemption information received in a control message. It will be appreciate that uplink operation is also contemplated and within the scope of the present disclosure. In particular, the UE 115 may receive an uplink grant for a shared channel data transmission and may adjust its encoding behavior based on preemption information conveyed in the control message. The techniques disclosed herein may be used in either link direction.

At block 305, a UE 115 is configured with one or more carriers. Each carrier in its set of configured carriers may be indexed at the UE 115. In some aspects, the primary component carrier (PCC) is assigned index '0' and each secondary component carrier (SCC) is assigned a non-zero index value. PCC may carry control information for PCC and cross-carrier control for one or more SCCs. In some aspects, SCCs may be self-scheduled and/or SCCs may be scheduled by other SCCs. Self-scheduling and cross-carrier scheduling may be indicative of the types of control messages which are monitored on each carrier and which may include unicast or group-common control messages carrying preemption information as described herein.

At block 310, the base station 105 schedules eMBB traffic on airlink resources. This may include, for example, the slot-based arrangement shown in FIG. 2 in which eMBB traffic and URLCC traffic are multiplexed on PDSCH resources. Base station 105 may identify, at block 315, one more carriers in a plurality of carriers for which preemption information is available. Due to strict latency requirements, URLLC traffic may preempt previously scheduled eMBB transmissions. In some aspects, the base station 105 punctures PDSCH resources assigned for eMBB traffic with the URLLC data. This puncturing/preemption may occur for each of a number of cells supported by base station 105 or for which base station 105 has preemption information. At block 315, the base station 105 may form an indication of the availability of preemption information which provides per-carrier information as to whether non-URLLC traffic is to be preempted. In some aspects, the indication includes a carrier index value and a preemption indicator. In other aspects, the ordering/arrangement of carrier index values may be separately configured and not explicitly signaled.

Based on the carriers for which preemption information is indicated as available, the base station 105 forms a variable-size preemption information payload. Using the implicit or explicit carrier index values, at block 320, the base station 105 sends one or more control messages 325 to the UE 115 which include the indication of availability for the plurality of carriers and the variable-size preemption information. In some aspects, the control message(s) may be sent on a downlink control channel such as PDCCH. In some aspects, the indication of availability may be sent separately (e.g., separate control messages) from the variable-size preemption information. For example, when sent separately, a first coding may be applied to the control message that carries the indication of availability and a second coding may be applied to the control message that carries the variable-size preemption information. This may be advantageous to provide greater reliability for the indication while using resources efficiency for the possibly larger preemption information payload. For example, the first coding may provide greater redundancy that the second coding.

Figure 4:
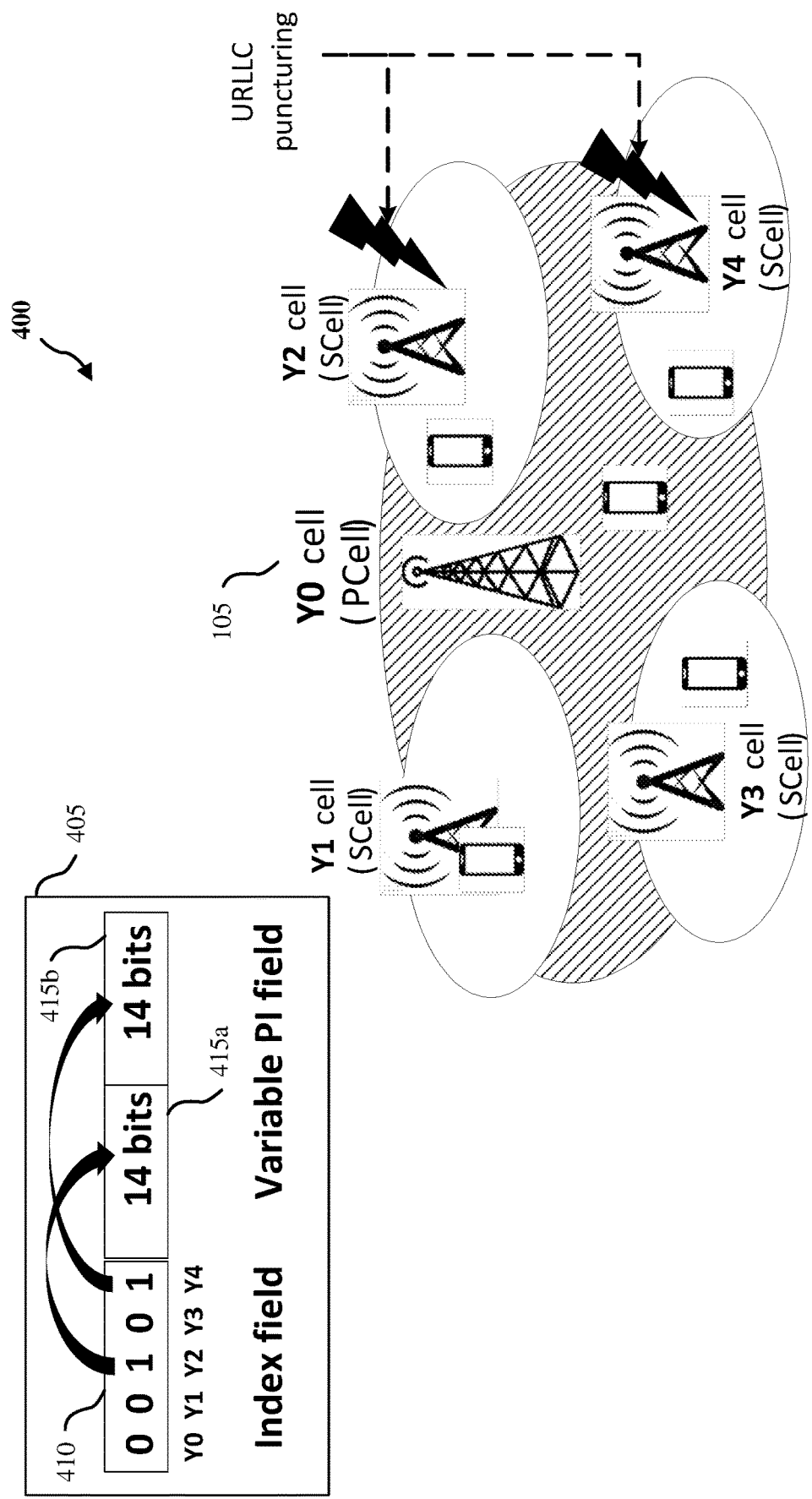
FIG. 4 illustrates an exemplary control message which provides multi-carrier preemption information in accordance with aspects of the present disclosure.

FIG. 4 shows aspects of an exemplary communication system 400 which provides multi-carrier preemption information in accordance with the present disclosure. As shown, a base station 105 provides a primary cell (Y0) for a plurality of UEs in its coverage area. As shown, secondary cells Y1, Y2, Y3, and Y4 are present and may provide additional bandwidth when configured as secondary carriers for the UEs which have Y0 as their primary carrier. In this example, primary cell Y0 carriers preemption information for five carriers Y0-Y4 by means of a control message 405. Control message 405 has an index field 410 and variable-size preemption information 415.

The exemplary 5-bit index field 410 of control message 405 provides an indication of the availability of preemption information for each carrier in the set of carriers that includes Y0-Y4. Here, a '1' signifies that preemption information is available in the variable-size preemption information 415, and a '0' signifies that it is not available. The index field 410 may be a fixed size with each bit corresponding to a different carrier in the plurality of carriers Y0-Y4. Because different UEs may be configured with different ones of secondary carriers Y1-Y4, in this example, UE-based carrier indices corresponding to cells Y1-Y4 may differ for different UEs. In some aspects, base station 105 provides a mapping of carriers to bits of the index field 410 and UEs 115 use the mapping to identify which among their scheduled carriers is indicated as having preemption information. Information for the mapping may be provided in a device configuration (e.g., RRC signaling), or by broadcast message (e.g., system information or other overhead signaling).

Variable-size preemption information 415 may be a second field of control message 405 or it may be sent in a separate control message as described above. Within variable-size preemption information 415, a location of the preemption information for a carrier in the plurality of carriers Y0-Y4 may vary based on a subset of carriers for which preemption information is indicated as available in the index field 410. The amount of preemption information may also vary according to a number of carriers in the plurality of carriers Y0-Y4 for which preemption information is indicated as available. In this example, the bits of index field 410 corresponding to cells Y2 and Y4 are set to '1' to indicate that preemption information is available for these carriers. The remaining bits of index field 410 are set to '0' indicating that no preemption information is available for the corresponding carriers.

Continuing with the example shown, the variable-size preemption information 415 includes 14-bit information elements 415a, 415b corresponding to the subset of carriers Y2, Y4 for which preemption information is indicated as available by the index field 410. These 14-bits elements may indicate which resources on the corresponding carrier are preempted for use by URLLC or other high-priority traffic. For instance, the 14 bits may represent RB indices on the shared channel that are affected by the preemption. Advantageously, with this arrangement, preemption information 415 is transmitted only for carriers that are indicated as having preemption information available. In this way, the preemption information 415 in control message 405 is still identifiable to the corresponding carriers Y2, Y4, while a significant reduction in message size may be achieved. For instance, rather than sending 5*14=60 bits of preemption information, only 14*2=28 bits is needed for the variable-size preemption information 415 disclosed herein.

Returning to the discussion of FIG. 3, the multi-carrier control message sent by base station 105 at block 320 can be as described for exemplary control message 405. In some aspects, the multi-carrier control message is a group-common control message available for use by a plurality of user equipment devices. The group-common control message may include a group-based downlink control information (DCI) message which may, for example, be scrambled by a group-identifier and sent in a common search space that is monitored by the intended group of UEs.

At block 330, the UE 115 receives the multi-carrier control message with variable-size preemption information from base station 105 and, at block 340, the UE 115 determines a resource allocation for its configured component carriers. In some aspects, determining the resource allocation may include receiving dynamic grants or utilizing semi-static resource allocations. For example, the UE 115 may determine which component carriers in its carrier aggregation configuration are scheduled to send or receive data transmissions on a shared channel in a particular slot or subframe. Then, based on an indication of the availability of preemption information from the multi-carrier control message (e.g., the index field 410), the UE 115 may determine whether one or more of its scheduled carriers are subject to preemption. In one aspect, if it is determined that preemption information is available for a scheduled carrier, the UE 115 may compare its scheduled resources from block 335 with the preemption information from the multi-carrier control message (e.g., the variable size preemption information 415) corresponding to each scheduled carrier.

At block 340, the UE 115 attempts to decode a data transmission on its scheduled carrier(s). Decoding may be based on a result of comparing its scheduled resources with preempted resources as previously indicated. Depending upon a result of the comparison, the UE 115 may decode as normal (with the expectation of errors), or it may avoid decoding the resources which have been preempted. Attempting to decode the preempted resources may be undesirable and may have a negative effect on HARQ operation. At signal 345, the UE 115 sends ACK/NACK feedback based on a result of the decoding. In some aspects, the ACK/NACK feedback may include more granular, code-block (CB) level feedback such that UE 115 requests retransmission for a only a portion of the scheduled resources that were affected by the preemption. In this way, the efficiency of the wireless communication system is improved while also reducing the size of the messages needed to support service multiplexing.

Figure 5:
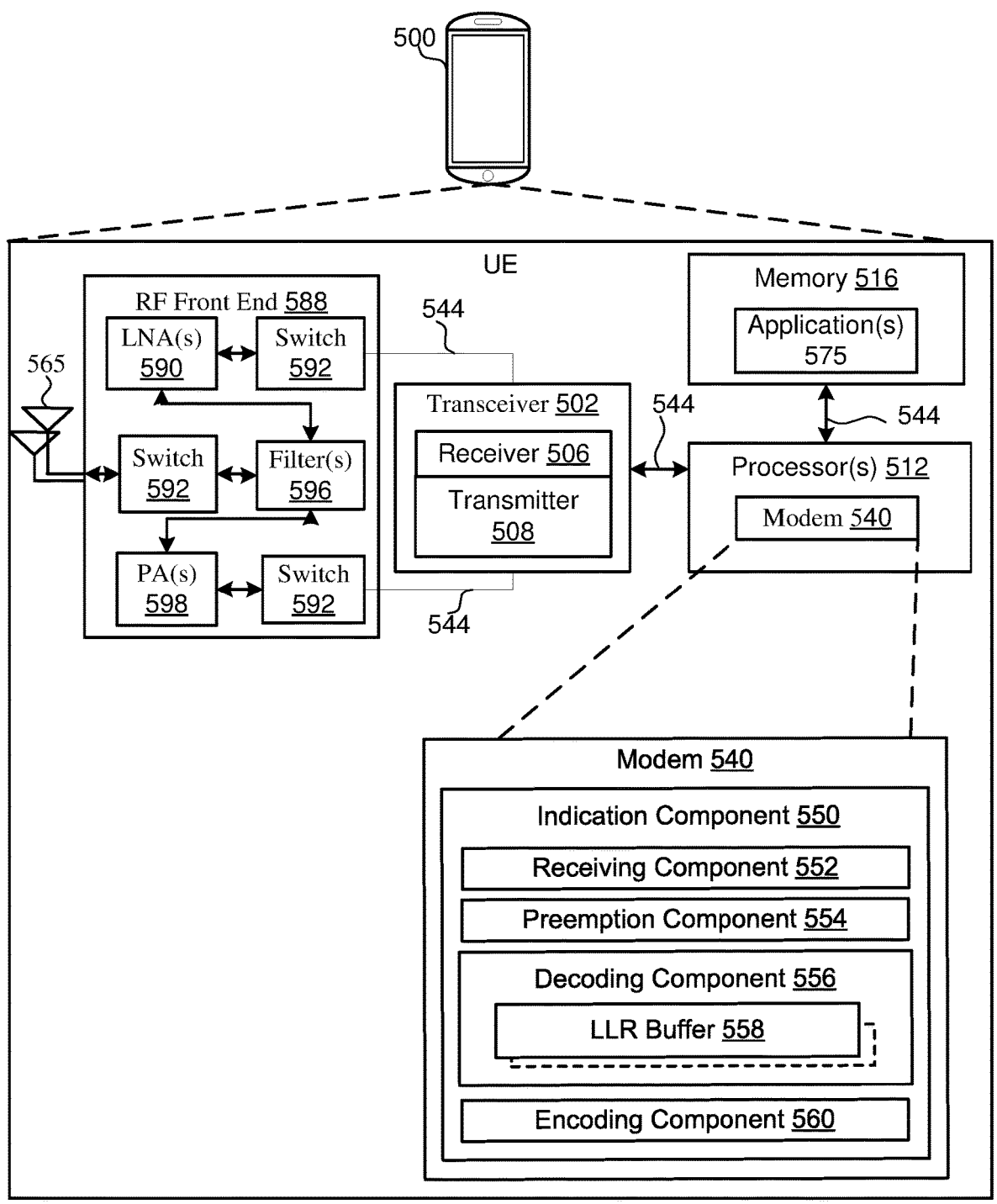
FIG. 5 shows a block diagram of a device that supports preemption-based multiplexing in accordance with aspects of the present disclosure.

FIG. 5 shows a block diagram of a device 500 that supports preemption-based multiplexing in accordance with aspects of the present disclosure. Device 500 may be one example of an implementation of a UE 115 and may include a variety of components including one or more of processors 512, memory 516, and transceiver 502, in communication via one or more buses 544. These elements may operate in conjunction with a modem 540 and an indication component 550 to enable one or more of the functions described herein related to use of multi-carrier preemption information. Further, the one or more processors 512, modem 540, memory 516, transceiver 502, RF front end 588 and one or more antennas 565, may be configured to support voice and/or data calls (simultaneously or non-simultaneously) in one or more radio access technologies.

In an aspect, the one or more processors 512 can include a modem 540 that uses one or more modem processors. The various functions related to indication component 550 may be included in modem 540 and/or the processors 512. In one aspect, the functions can be executed by a single processor 512 in conjunction with other elements, while in other aspects, different ones of the functions may be executed by a combination of two or more different processors 512. For example, in an aspect, the one or more processors 512 may include any one or any combination of a modem processor, or a baseband processor, or a digital signal processor, or a transmit processor, or a receive processor, or a transceiver processor associated with transceiver 502. In other aspects, some of the features of the one or more processors 512 and/or modem 540 associated with indication component 550 may be performed by transceiver 502.

In one aspect, the indication component 550 may support preemption of resources among different types of traffic. As shown, the indication component 550 can include a receiving component 552, a preemption component 554, a decoding component 556, and an encoding component 560. Decoding component 556 can include an LLR buffer (soft buffer) 558 for storing log-likelihood ratios in connection with HARQ operation. In one example, receiving component 552 can receive downlink control information (DCI) messages via transceiver 502, including resource grants and control message with multi-carrier preemption information. In the event that none of the scheduled carriers for the UE 115 is affected by preemption, encoding component 560 and decoding component 556 can perform normally and can, respectively, operate to encode signals for uplink transmission or decode signals received in a downlink transmission.

When a DCI message with multi-carrier preemption information is received by receiving component 552, preemption component 554 can determine whether preemption information is indicated as available for at least one carrier on which the UE 115 is scheduled to send or receive a data transmission. If such preemption information is available, preemption component 554 can obtain the preemption information from the DCI message and compare it to the scheduled resources on the affected carrier or carriers. The DCI message can be as variously described herein and, in particular, it may contain variable-size preemption information. Based on a result of the comparison, preemption component 554 can control the respective operations of encoding component 560 and decoding component 556. For example, preemption component 554 can determine an overlap between scheduled resources for a given carrier and preempted resources signaled in the preemption information. In the case of receiving a data transmission on the downlink, preemption component 554 can cause decoding component to avoid decoding the preempted resources and thereby avoid corrupting the contents of LLR buffer 558. In the case of sending an uplink transmission, preemption component 554 can cause encoding component to avoid using preempted resources when sending a data transmission on the uplink. This preemption management may involve discarding or dropping transmissions or adjusting a rate matching behavior of UE 115 to account for the missing resources and can involve any combination of the features described herein.

Memory 516 may be configured to store data used herein and/or local versions of applications 575 or indication component 550 and/or one or more of its subcomponents being executed by at least one processor 512. Memory 516 can include any type of computer-readable medium usable by a computer or at least one processor 512, such as random access memory (RAM), read only memory (ROM), magnetic discs, optical discs, volatile memory, non-volatile memory, and any combination thereof. In an aspect, for example, memory 516 may be a non-transitory computer-readable storage medium that stores one or more computer-executable codes defining indication component 550 and/or one or more of its subcomponents, and/or data associated therewith, when UE 115 is operating with at least one processor 512 to execute indication component 550 and/or one or more of its subcomponents. In general, memory 516 can store instructions and data usable by one or more of processors 512 (including modem 540) to control the operation of UE 115 as described herein, including carrying out the steps of algorithms the various algorithms and functions.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, UE 115 may include RF front end 588, which may operate in communication with one or more antennas 565 and transceiver 502 for receiving and transmitting radio signals, for example, wireless communications transmitted by at least one base station 105 or wireless transmissions transmitted by UE 115. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal to achieve a desired output level. In an aspect, each LNA 590 may have specified minimum and maximum gain values. In an aspect, RF front end 588 may use one or more switches 592 to select a particular LNA 590 and its specified gain value based on a desired gain for a particular application.

Further, for example, one or more PA(s) 598 may be used by RF front end 588 to amplify a signal for an RF output at a desired output power level. In an aspect, each PA 898 may have specified minimum and maximum gain values. In an aspect, RF front end 588 may use one or more switches 592 to select a particular PA 598 and its specified gain value based on a desired gain value for a particular application.

One or more filters 596 can also be used as part of RF front end 588 to filter a received signal to obtain an input RF signal. Similarly, in an aspect, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

Transceiver 502 may be configured to transmit and receive wireless signals through one or more antennas 565 via RF front end 588. In an aspect, transceiver 502 may be tuned to operate at specified frequencies such that UE 115 can communicate with, for example, one or more base stations 105 or one or more cells associated with one or more base stations 105. In an aspect, for example, modem 540 can configure transceiver 502 to operate at a specified frequency and power level based on the UE configuration of the UE 115 and the communication protocol used by modem 540.

In an aspect, modem 540 can be a multiband-multimode modem, which can process digital data and communicate with transceiver 502 such that the digital data is sent and received using transceiver 502. In an aspect, modem 540 can be multiband and be configured to support multiple frequency bands for a specific communications protocol such as in support of carrier aggregation. In an aspect, modem 540 can be multimode and be configured to support multiple radio access technologies and communication protocols. In an aspect, modem 540 can control one or more components of UE 115 (e.g., RF front end 588, transceiver 502) to enable transmission and/or reception of signals from a network based on a specified modem configuration. In an aspect, the modem configuration can be based on the operating mode of 540 modem and the frequency band in use. In another aspect, the modem configuration can be based on UE configuration information associated with UE 115 as provided by the network during cell selection and/or cell reselection.

Figure 6:
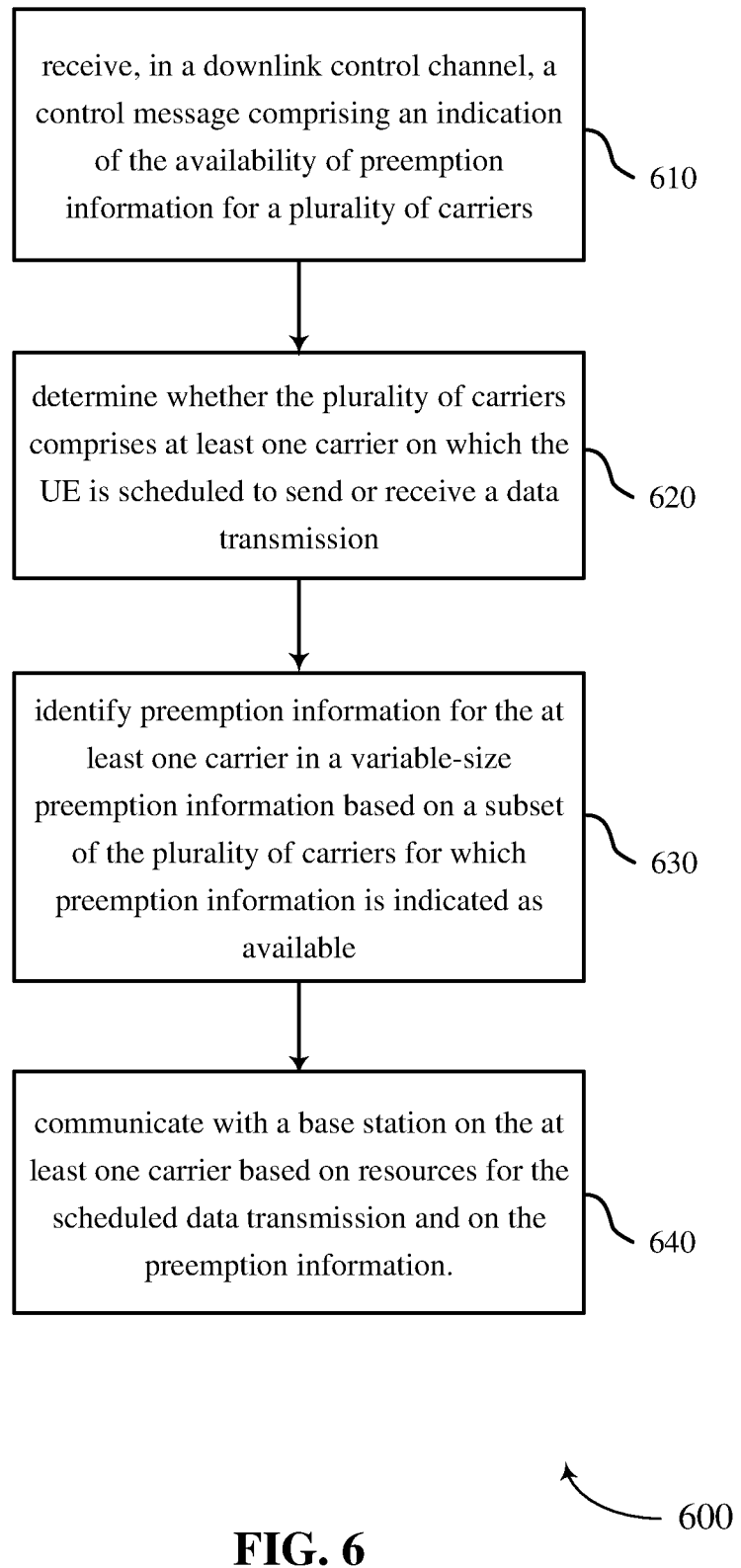
FIG. 6 illustrates a method for wireless communication performed by a user equipment in accordance with aspects of the present disclosure.

FIG. 6 illustrates a method 600 for wireless communication in accordance with aspects of the present disclosure. The operations of method 600 may be implemented by a UE 115 or its components as described herein. For example, the operations of method 600 may be performed by one or more of processors 512, memory 516, modem 540, and transceiver 502 as described with reference to the structure of FIG. 5 and may encompass any of the different aspects or feature combinations described in connection with FIGS. 1-4. In some examples, a UE 115 may execute a set of codes to control various structural elements of the device to perform the functions described below. Additionally or alternatively, the UE 115 may perform aspects of the functions described below using special-purpose hardware.

At block 610, the UE may receive, in a downlink control channel, a control message comprising an indication of the availability of preemption information for a plurality of carriers. In some aspects, the control message may be a dedicated control message. In other aspects, the control message may be a group-common control message that is intended for a group of UEs served by a base station. The plurality of carriers for which the indication of availability is provided may include one or more carriers forming part of a carrier aggregation configuration of the UE and one or more carriers not configured for use by the UE. In some cases, the control message is transmitted on a PCC of the UE and provides preemption information for the PCC and one or more SCCs. In other cases, the control message may be received on an SCC and may provide multi-carrier preemption information for one or more SCCs.

At block 620, the UE determines whether the plurality of carriers comprises at least one carrier on which the UE is scheduled to send or receive a data transmission. This may include determining, for a given slot or subframe, scheduling information for each of its configured component carriers and comparing the set of scheduled component carriers with the indication of availability in the control message. In one aspect, determining whether the plurality of carriers comprises at least one carrier on which the UE is scheduled to send or receive a data transmission involves a mapping or association between bits of the control message comprising the indication of the availability of preemption information and corresponding carrier indices in the carrier aggregation configuration of the UE. For example, as described in connection with FIG. 4, the ordering or arrangement of carriers Y0-Y4 in index field 410 may be signaled to the UE as part of a dedicated (RRC) configuration or it may be broadcast in system information by the serving base station. The UE may then map or associate the carriers of index field 410 with corresponding ones of its configured carriers to facilitate use of the indication of availability in determining the at least one scheduled carrier possibly affected by preemption. This mapping or association may be particularly useful when the control message is a group-common control message.

At block 630, the UE identifies preemption information for the at least one carrier in a variable-size preemption information based on a subset of the plurality of carriers for which preemption information is indicated as available. In one aspect, the control message comprises a first field which provides the indication of availability for the plurality of carriers, and a second field that provides the variable-size preemption information. The first field and the second field may be coded differently and, in some aspects, they may be transmitted separately (e.g., a single control message with differently coded fields, or different control messages conveying the different fields and possibly subject to different coding). The UE may identify a subset of the plurality of carriers which are indicated as having preemption information, may identify its at least one scheduled carrier from the subset, and may access the corresponding preemption information in the variable-size field according to the position of its at least one scheduled carrier in the subset. Some aspects of this identification can be appreciated with reference to FIG. 4 in which the UE identifies the subset of carriers for which preemption information is available (Y2, Y4) using index field 410, and then accesses the corresponding preemption information in the variable-size preemption information field 415 based on the ordering of the carriers in the subset.

The UE then communicates, at block 640, with the base station on the at least one carrier based on resources for the scheduled data transmission and on the preemption information. For uplink data transmission, this may involve avoiding use of some or all shared channel resources and varying a rate matching behavior in accordance which resources in the allocation are not preempted. For downlink data reception, this may involve discarding preempted resources and sending appropriate HARQ feedback. Additional details and feature combinations which may be utilized with method 600 are provided in the description of other figures herein.

Figure 7:
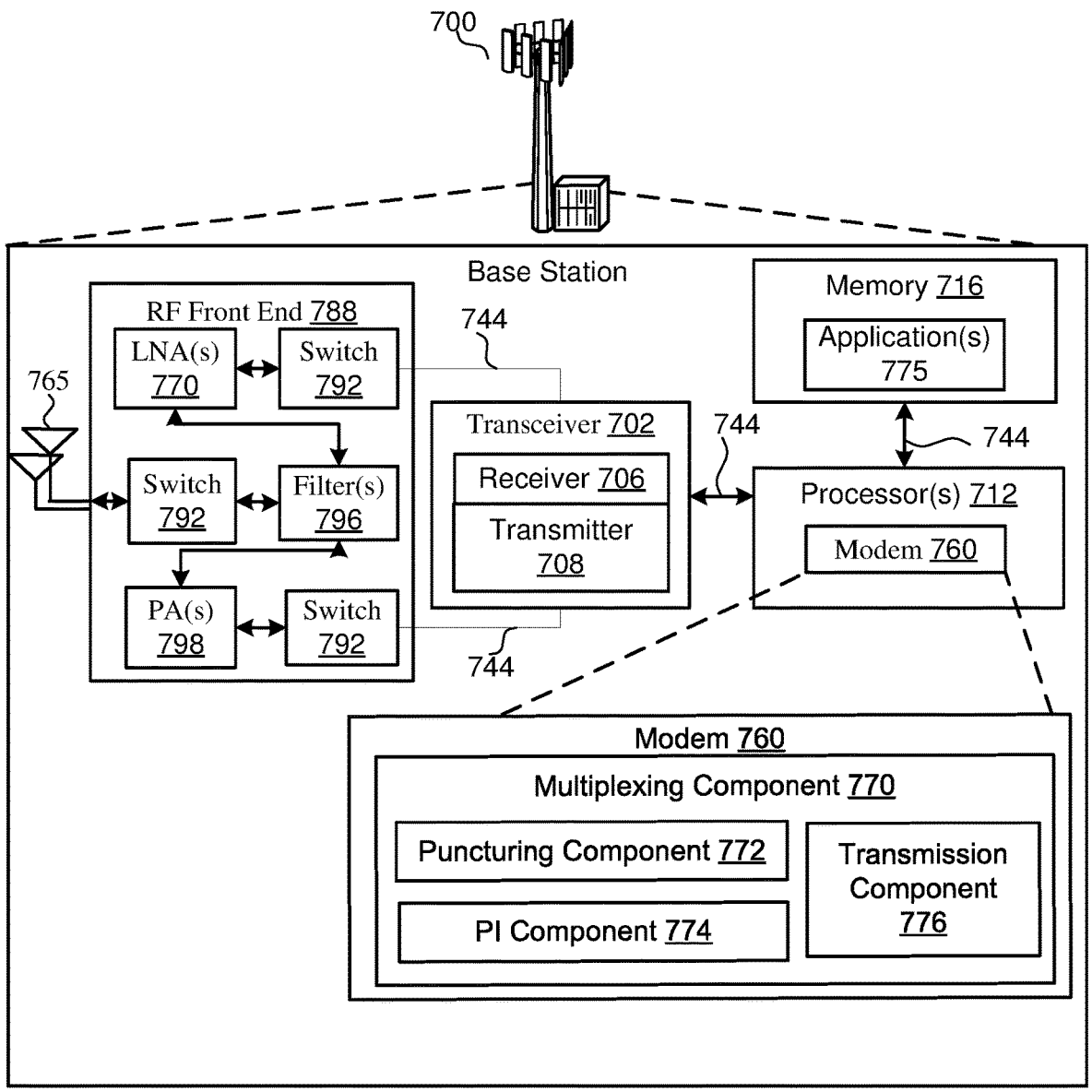
FIG. 7 shows a block diagram of a device that supports preemption-based multiplexing in accordance with aspects of the present disclosure.

FIG. 7 shows a block diagram of a device 700 that supports preemption-based multiplexing in accordance with aspects of the present disclosure. Device 700 can be an example of an implementation of base station 105 and may include a variety of components, some of which have already been described above. In particular, transceiver 702, receiver 706, transmitter 708, one or more processors 712, memory 716, applications 775, buses 744, RF front end 788, LNAs 790, switches 792, filters 796, PAs 798, and the one or more antennas 765 may be the same as or similar to corresponding components of UE 115 as described in connection with FIG. 5, but may be configured or otherwise programmed for base station operations as opposed to UE operations.

As with UE 115, the various elements of base station 105 may operate in conjunction with a modem 760 and a multiplexing component 770 to enable one or more of the functions described herein related to preemption signaling. As shown, multiplexing component 770 may include a puncturing component 772, a preemption information component 774, and transmission component 776.

In some aspects, modem 760 and/or processors 712 may schedule a group of user equipment devices to send or receive data transmissions. As previously described, shared channel resources may be allocated for use by the different UEs and the scheduling may involving sending control information indicating the allocated resources. When high priority data, such as URLLC data is detected, the scheduling may need to be preempted in order to satisfy latency and reliability requirements associated with the high priority data. In some aspects, multiplexing component 770 is operative to manage the multiplexing of different traffic types and to provide UEs with preemption information.

When high priority data is detected, modem 760 and/or processors 712 may first determine a carrier and corresponding uplink or downlink resources on which the high priority data should be communicated. These resources may overlap with existing assignments on a shared data channel. Puncturing component 772 may be configured to puncture the overlapping shared channel resources to accommodate the high priority transmission. For example, existing eMBB allocations may be punctured with URLLC data as previously described. Preemption information (PI) component 774 may generate a control message with multi-carrier preemption information as described herein which identifies carriers and resources that are affected by the operation of puncturing component 772. FIG. 4 provides an example of a control message 405 with multi-carrier preemption information which may be generated by the operation of the multiplexing component 770 or, more generally, by device 700 by operation of processors 712 and related components.

Transmission component 776 may be configured to send the control message to one or more UEs. In some aspects, the control message is a dedicated control message which may, for example, be scrambled by an identifier of a UE or otherwise directed to its intended recipient. In other aspects, the control message is a group-common message which is intended for use by a group of UEs that may be affected by the preemption. As previously discussed, the indication of availability of the preemption information and the variable-size preemption information may be placed in different control messages and/or may be differently coded. Transmission component 776 may also be configured to signal a mapping or association between bits of the control message comprising the indication of availability and carrier identifiers. As previously discussed, such a mapping or association may assist each UE to identify which of its configured carriers has preemption information and then how to identify it in a variable size preemption information payload.

Figure 8:
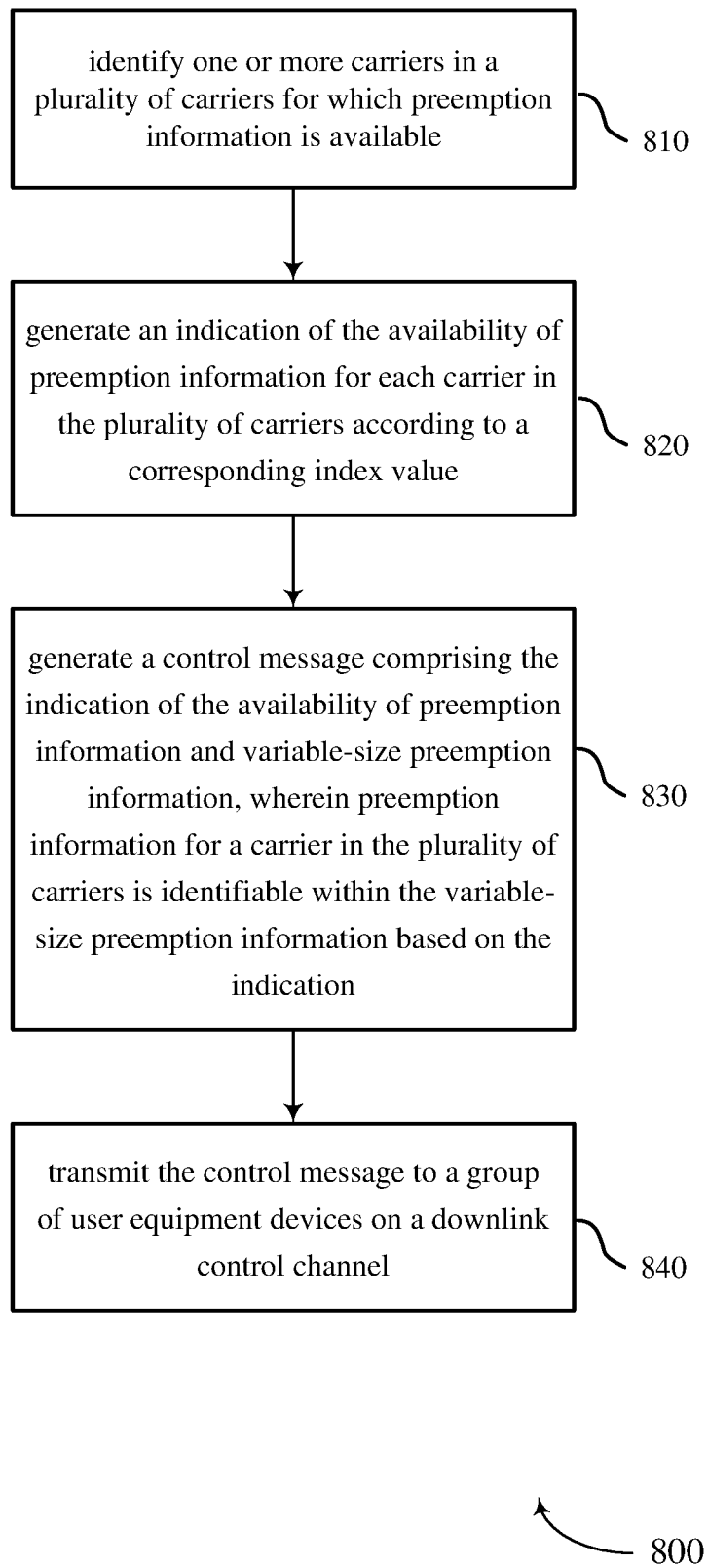
FIG. 8 illustrates a method for wireless communication performed by a base station in accordance with aspects of the present disclosure.

FIG. 8 shows a method 800 for wireless communication in accordance with aspects of the present disclosure. The operations of method 800 may be implemented by a base station 105 or its components as described herein. For example, the operations of method 800 may be performed by one or more of processors 712, memory 716, modem 740, and transceiver 702 as described with reference to FIGS. 5 and 7 and may encompass any combination of features described in FIGS. 1-4. In some examples, a base station 105 may execute a set of codes to control various structural elements of the device to perform the functions described below. Additionally or alternatively, the base station 105 may perform aspects of the functions described below using special-purpose hardware.

At block 810, the base station 105 may identify one or more carriers in a plurality of carriers for which preemption information is available. For example, in a given slot or subframe of each carrier in the plurality of carriers, the base station may determine that high priority data transmission is to be sent to or received from a user equipment The high priority data transmission may use resources that overlap with resources scheduled for lower priority transmissions thereby creating a need to inform the scheduled users of the preempted resources. For instance, portions of currently scheduled or ongoing eMBB transmissions may be reassigned for URLLC traffic.

At block 820, the base station 105 may generate an indication of the availability of preemption information for each carrier in the plurality of carriers according to a corresponding index value. The indication of availability may comprise a fixed size field for which different bits correspond to different carriers in the plurality of carriers and in which different carriers are ordered/arranged/indexed in a manner related to the placement of corresponding preemption information in a variable size preemption information field. In one example, the indication of availability may signal a subset of carriers for which preemption information is available and the ordering of the carriers in the subset may determine the arrangement of the variable size preemption information. In this way, a location of the preemption information for a carrier in the plurality of carriers can vary based on the subset of carriers for which preemption information is indicated as available. The size of the preemption information will likewise vary leading to a more efficient use of airlink resources.

At block 830, the base station generates a control message comprising the multi-carrier indication of the availability of preemption information and the variable-size preemption information in which preemption information for a carrier in the plurality of carriers is identifiable within the variable-size preemption information based on the indication. At block 840, the base station transmits the control message to a group of user equipment devices on a downlink control channel.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication performed by a user equipment (UE), comprising:
   receiving, in a downlink control channel, a control message comprising an indication of the availability of preemption information for previously scheduled data transmissions on a plurality of carriers;
   determining whether the plurality of carriers comprises at least one carrier on which the UE has a previously scheduled data transmission;
   identifying preemption information for the at least one carrier in a variable-size preemption information based on a subset of the plurality of carriers for which preemption information is indicated as available; and
   communicating with a base station on the at least one carrier based on resources for the previously scheduled data transmission and on the preemption information.

2. The method of claim 1, wherein a location of the preemption information for the at least one carrier varies based on the subset of the plurality of carriers for which preemption information is indicated as available.

3. The method of claim 1, further comprising:
   determining a mapping between bits of the control message comprising the indication of the availability of preemption information and corresponding carrier indices in a carrier aggregation configuration of the UE,
   wherein determining whether the plurality of carriers comprises at least one carrier on which the UE is scheduled to send or receive a data transmission is based at least in part on the mapping.

4. The method of claim 1, wherein the indication of the availability of preemption information comprises a first field of the control message having a fixed size, and wherein the variable-size preemption information comprises a second field of the control message having a variable size.

5. The method of claim 4, wherein the first field has a first coding and the second field has a second coding with less redundancy than the first coding.

6. The method of claim 1, further comprising identifying a subset of resources on which the UE is scheduled to send or receive the data transmission that are unavailable based on the preemption information.

7. The method of claim 6, further comprising:
   excluding the subset of resources from a decoding operation performed by the UE; and
   sending HARQ feedback to the base station based on a result of the decoding operation.

8. The method of claim 1, wherein the control message is common to a plurality of UEs and an amount of preemption information varies according to a number of carriers in the plurality of carriers for which preemption information is indicated as available.

9. The method of claim 1, wherein the plurality of carriers comprise a primary component carrier and one or more secondary component carriers in a carrier aggregation configuration of the UE.

10. The method of claim 1, wherein the scheduled data transmission is an enhanced mobile broadband (eMBB) data transmission and the preemption information identifies resources reassigned for an ultra reliable low latency (URLLC) transmission which are temporarily unavailable for the eMBB data transmission.

11. The method of claim 1, further comprising receiving a second control message in the downlink control channel, the second control message comprising the preemption information.

12. A method for wireless communication performed by a base station, comprising:
   identifying one or more carriers in a plurality of carriers for which preemption information for previously scheduled data transmissions is available;
   generating an indication of the availability of preemption information for each carrier in the plurality of carriers according to a corresponding carrier index;
   generating a control message comprising the indication of the availability of preemption information and variable-size preemption information, wherein preemption information for a carrier in the plurality of carriers is identifiable within the variable-size preemption information based on the indication; and
   transmitting the control message to a group of user equipment devices on a downlink control channel.

13. The method of claim 12, wherein a location of the preemption information for a carrier in the plurality of carriers varies based on a subset of the plurality of carriers for which the preemption information is indicated as available.

14. The method of claim 12, determining a mapping between bits of the control message comprising the indication of the availability of preemption information and corresponding carrier indices utilized by user equipment devices in the group of user equipment devices, wherein generating the control message is based at least in part on the mapping.

15. The method of claim 12, wherein the indication of the availability of preemption information comprises a first field of the control message having a fixed size, and wherein the variable-size preemption information comprises a second field of the control message having a variable size.

16. The method of claim 15, wherein the first field has a first coding and the second field has a second coding with less redundancy than the first coding.

17. The method of claim 12, wherein the preemption information identifies a subset of resources which is unavailable for sending or receiving data transmissions by user equipment devices in the group of user equipment devices.

18. The method of claim 12, wherein the control message is a group-common control message monitored by user equipment devices in the group of user equipment devices and an amount of the variable-size preemption information varies according to a number of carriers in the plurality of carriers for which preemption information is indicated as available.

19. The method of claim 12, wherein at least one user equipment device in the group of user equipment devices is scheduled to receive an enhanced mobile broadband (eMBB) data transmission, and wherein the preemption information identifies resources reassigned for an ultra reliable low latency (URLLC) transmission which are temporarily unavailable for the eMBB data transmission.

20. The method of claim 12, wherein transmitting the control message comprises transmitting a first control message with the indication of the availability of preemption information for the previously scheduled data transmissions, and transmitting a second control message with the variable-size preemption information.

21. A user equipment (UE), comprising:
means for receiving, in a downlink control channel, a control message comprising an indication of the availability of preemption information for previously scheduled data transmissions on a plurality of carriers;
means for determining whether the plurality of carriers comprises at least one carrier on which the UE has a previously scheduled data transmission;
means for identifying preemption information for the at least one carrier in a variable-size preemption information based on a subset of the plurality of carriers for which preemption information is indicated as available; and
means for communicating with a base station on the at least one carrier based on resources for the previously scheduled data transmission and on the preemption information.

22. The user equipment of claim 21, wherein a location of the preemption information for the at least one carrier varies based on the subset of the plurality of carriers for which preemption information is indicated as available.

23. The user equipment of claim 21, further comprising:
means for determining a mapping between bits of the control message comprising the indication of the availability of preemption information and corresponding carrier indices in a carrier aggregation configuration of the UE,
wherein the means for determining whether the plurality of carriers comprises at least one carrier on which the UE is scheduled to send or receive a data transmission is operative based at least in part on the mapping.

24. The user equipment of claim 21, wherein the indication of the availability of preemption information comprises a first field of the control message having a fixed size, and wherein the variable-size preemption information comprises a second field of the control message having a variable size.

25. The user equipment of claim 21, further comprising means identifying a subset of resources on which the UE is scheduled to send or receive the data transmission that are unavailable based on the preemption information.

26. An apparatus for wireless communication, comprising:
a processor;
memory coupled with the processor; and
instructions stored in the memory and operable, when executed by the processor, to cause the apparatus to:
receive, in a downlink control channel, a control message comprising an indication of the availability of preemption information for previously scheduled data transmissions on a plurality of carriers;
determine whether the plurality of carriers comprises at least one carrier on which the apparatus has a previously scheduled a data transmission;
identify preemption information for the at least one carrier in a variable-size preemption information based on a subset of the plurality of carriers for which preemption information is indicated as available; and
communicate with a base station on the at least one carrier based on resources for the previously scheduled data transmission and on the preemption information.

27. The apparatus of claim 26, wherein a location of the preemption information for the at least one carrier varies based on the subset of the plurality of carriers for which preemption information is indicated as available.

28. The apparatus of claim 26, wherein the instructions are further operable, when executed by the processor, to cause the apparatus to:
determine a mapping between bits of the control message comprising the indication of the availability of preemption information and corresponding carrier indices in a carrier aggregation configuration of the UE,
wherein determining whether the plurality of carriers comprises at least one carrier on which the UE is scheduled to send or receive a data transmission is based at least in part on the mapping.

29. The apparatus of claim 26, wherein the indication of the availability of preemption information comprises a first field of the control message having a fixed size, and wherein the variable-size preemption information comprises a second field of the control message having a variable size.

30. The apparatus of claim 26, wherein the instructions are further operable, when executed by the processor, to cause the apparatus to identify a subset of resources on which the UE is scheduled to send or receive the data transmission that are unavailable based on the preemption information.

31. A non-transitory computer readable medium storing code for wireless communication, the code comprising instructions executable by a processor to:
receive, in a downlink control channel, a control message comprising an indication of the availability of preemption information for previously scheduled data transmissions on a plurality of carriers;
determine whether the plurality of carriers comprises at least one carrier on which an apparatus has a previously scheduled data transmission;
identify preemption information for the at least one carrier in a variable-size preemption information based on a subset of the plurality of carriers for which preemption information is indicated as available; and
communicate with a base station on the at least one carrier based on resources for the previously scheduled data transmission and on the preemption information.

32. A base station, comprising:
means for identifying one or more carriers in a plurality of carriers for which preemption information for previously scheduled data transmissions is available;

means for generating an indication of the availability of preemption information for each carrier in the plurality of carriers according to a corresponding carrier index;

means for generating a control message comprising the indication of the availability of preemption information and variable-size preemption information, wherein preemption information for a carrier in the plurality of carriers is identifiable within the variable-size preemption information based on the indication; and means for transmitting the control message to a group of user equipment devices on a downlink control channel.

33. The base station of claim 32, wherein a location of the preemption information for a carrier in the plurality of carriers varies based on a subset of the plurality of carriers for which the preemption information is indicated as available.

34. The base station of claim 32, further comprising:
means for determining a mapping between bits of the control message comprising the indication of the availability of preemption information and corresponding carrier indices utilized by user equipment devices in the group of user equipment devices, wherein the means for generating the control message is operative based at least in part on the mapping.

35. The base station of claim 32, wherein the indication of the availability of preemption information comprises a first field of the control message having a fixed size, and wherein the variable-size preemption information comprises a second field of the control message having a variable size.

36. The base station of claim 32, wherein the preemption information identifies a subset of resources which is unavailable for sending or receiving data transmissions by user equipment devices in the group of user equipment devices.

37. The base station of claim 32, wherein the control message is a group-common control message monitored by user equipment devices in the group of user equipment devices and an amount of the variable-size preemption information varies according to a number of carriers in the plurality of carriers for which preemption information is indicated as available.

38. An apparatus for wireless communication, comprising:
a processor;
memory coupled with the processor; and
instructions stored in the memory and operable, when executed by the processor, to cause the apparatus to:
identify one or more carriers in a plurality of carriers for which preemption information for previously scheduled data transmissions is available;
generate an indication of the availability of preemption information for each carrier in the plurality of carriers according to a corresponding carrier index;
generate a control message comprising the indication of the availability of preemption information and variable-size preemption information, wherein preemption information for a carrier in the plurality of carriers is identifiable within the variable-size preemption information based on the indication; and
transmit the control message to a group of user equipment devices on a downlink control channel.

39. The apparatus of claim 38, wherein a location of the preemption information for a carrier in the plurality of carriers varies based on a subset of the plurality of carriers for which the preemption information is indicated as available.

40. The apparatus of claim 38, wherein the instructions are further operable, when executed by the processor, to cause the apparatus to determine a mapping between bits of the control message comprising the indication of the availability of preemption information and corresponding carrier indices utilized by user equipment devices in the group of user equipment devices, wherein generating the control message is based at least in part on the mapping.

41. The apparatus of claim 38, wherein the indication of the availability of preemption information comprises a first field of the control message having a fixed size, and wherein the variable-size preemption information comprises a second field of the control message having a variable size.

42. The apparatus of claim 38, wherein the control message is a group-common control message monitored by user equipment devices in the group of user equipment devices and an amount of the variable-size preemption information varies according to a number of carriers in the plurality of carriers for which preemption information is indicated as available.

43. A non-transitory computer readable medium storing code for wireless communication, the code comprising instructions executable by a processor to:
identify one or more carriers in a plurality of carriers for which preemption information for previously scheduled data transmissions is available;
generate an indication of the availability of preemption information for each carrier in the plurality of carriers according to a corresponding carrier index;
generate a control message comprising the indication of the availability of preemption information and variable-size preemption information, wherein preemption information for a carrier in the plurality of carriers is identifiable within the variable-size preemption information based on the indication; and
transmit the control message to a group of user equipment devices on a downlink control channel.

* * * * *